(12) United States Patent
Prescott et al.

(10) Patent No.: US 8,917,739 B2
(45) Date of Patent: Dec. 23, 2014

(54) METHOD AND APPARATUS TO DYNAMICALLY SAMPLE NRT USING A DOUBLE-ENDED QUEUE THAT ALLOWS FOR SEAMLESS TRANSITION FROM FULL NRT ANALYSIS TO SAMPLED NRT ANALYSIS

(71) Applicant: Fluke Corporation, Everett, WA (US)

(72) Inventors: Dan Prescott, Elbert, CO (US); Craig Odell, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 55 days.

(21) Appl. No.: 13/741,582

(22) Filed: Jan. 15, 2013

(65) Prior Publication Data
US 2014/0198671 A1 Jul. 17, 2014

(51) Int. Cl.
*H04L 12/28* (2006.01)
*H04L 12/54* (2013.01)
*H04L 12/26* (2006.01)

(52) U.S. Cl.
CPC ............ *H04L 43/04* (2013.01); *H04L 43/0864* (2013.01)
USPC .......................................... 370/412; 370/429

(58) Field of Classification Search
USPC .................. 370/412, 413, 414, 429
See application file for complete search history.

(56) References Cited

U.S. PATENT DOCUMENTS

| 6,215,769 | B1 * | 4/2001 | Ghani et al. ................... 370/230 |
| 2007/0297453 | A1 * | 12/2007 | Niinomi ......................... 370/474 |
| 2014/0078911 | A1 * | 3/2014 | Prescott et al. ................ 370/252 |

FOREIGN PATENT DOCUMENTS

JP 2009194565 A * 8/2009

OTHER PUBLICATIONS

Japanese-to-English translation of Japanese patent publication JP2009194565A to Hasegawa et al. retreived from the Internet via AIPN on May 27, 2014.*

* cited by examiner

*Primary Examiner* — Benjamin H Elliott, IV
(74) *Attorney, Agent, or Firm* — Edwards Wildman Palmer LLP; Scott D. Wofsy; Christopher J. Capelli

(57) ABSTRACT

A network round trip time measurement apparatus and method employ an allocated storage in the form of a double ended queue, to store data received while awaiting a corresponding receipt of data to allow the network round trip time to be determined. When the allocated size of the storage is exceeded, storage stops until such time as data is received to allow network round trip time to be determined on at least some of the already stored data, whereupon storage can resume. This allows use in high and low volume traffic situations to automatically scale back the amount of data processed, so as to not overtax available resources.

14 Claims, 3 Drawing Sheets

METHOD AND APPARATUS TO DYNAMICALLY SAMPLE NRT USING A DOUBLE-ENDED QUEUE THAT ALLOWS FOR SEAMLESS TRANSITION FROM FULL NRT ANALYSIS TO SAMPLED NRT ANALYSIS

BACKGROUND OF THE INVENTION

This invention relates to network test and measurement, and more particularly to determination of network response time at both high traffic rates and low traffic rates.

The ability to correctly measure Network Response Time (NRT) under varying conditions is desirable. Under certain high-latency conditions, it is possible for packet-acknowledgement-time to grow large. This requires a large amount of state to perform NRT measurements. The necessary state would include packet information for every packet. Such conditions lead to large resource requirements, which may exceed the capacity available for storage and processing.

SUMMARY OF THE INVENTION

In accordance with the disclosure, the ability to measure Network Response Time (NRT) seamlessly transitioning between examining all NRT measurements to a distributed sample of NRT measurements at high packet rates is provided. This solves the problem of calculating NRT at high traffic rates via sampling while still allowing verbose analysis at low packet rates and therefore allows the system to support the entire spectrum of packet rates. By using this mechanism, the system can change its NRT sampling rate as necessary to support the current traffic load without external configuration or input.

Accordingly, it is an advantage of the present disclosure to provide an improved network round trip measurement method and apparatus.

It is a further advantage of the present disclosure to provide an improved network round trip measurement that can calculate NRT at high traffic rates as well as low traffic rates.

It is yet a further advantage of the present disclosure to provide an improved network round trip measurement that can calculate sampled NRT at high traffic rates and verbose NRT at low traffic rates.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

BRIEF DESCRIPTION OF THE DRAWINGS

FIG. 2 is a diagram illustrating traffic in operation of the NRT measurement; and.

DETAILED DESCRIPTION

The system according to a preferred embodiment of the present disclosure comprises method and apparatus to measure Network Response Time (NRT)

Figure 1:
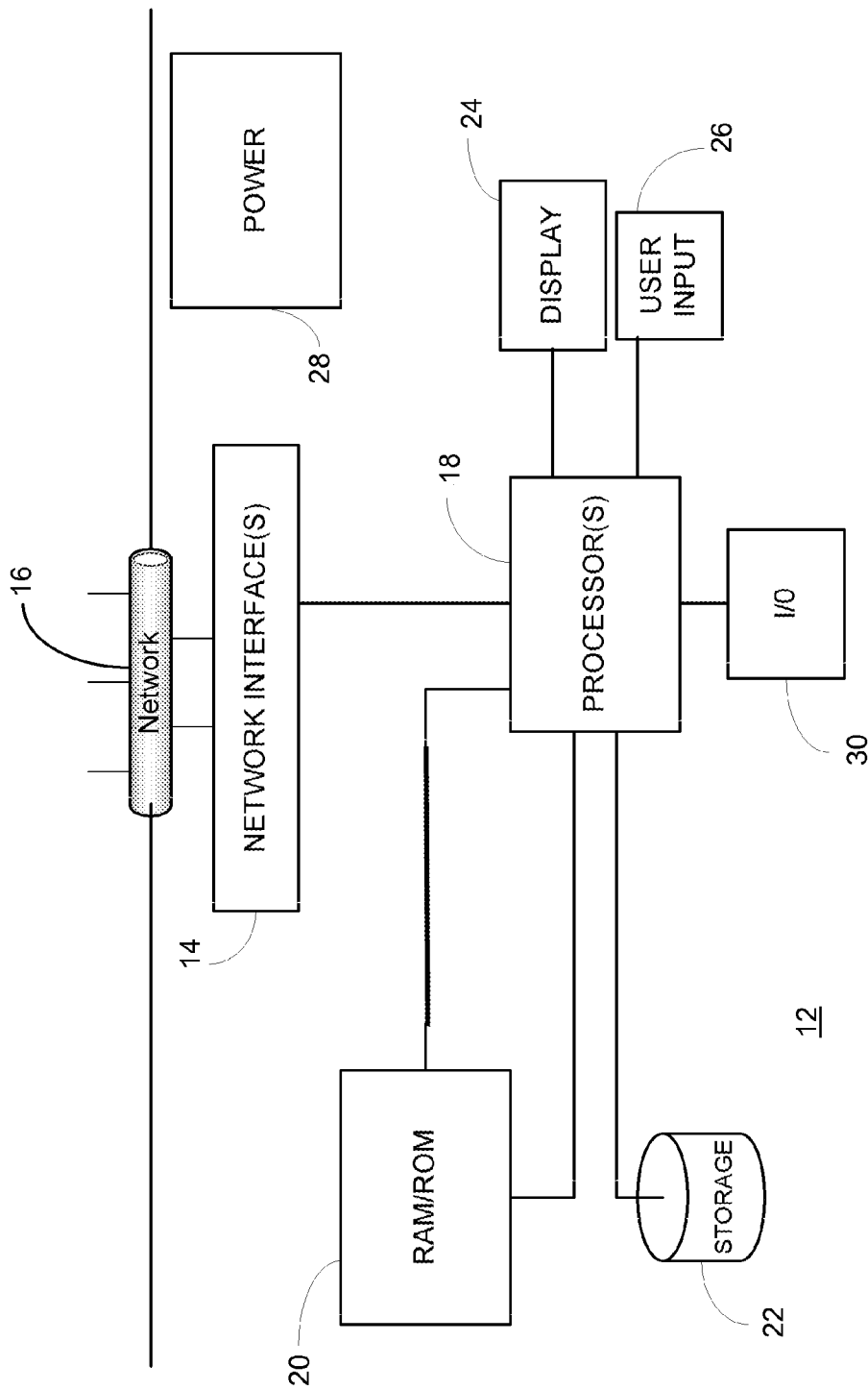
FIG. 1 is a block diagram of a test instrument implementing the apparatus, system and method to achieve NRT measurement.

FIG. 1 is a block diagram of a network test instrument 12 implementing the methods and apparatus, wherein the instrument may include network interfaces 14 which attach the device to a network 16 via multiple ports, one or more processors 18 for operating the instrument, memory such as RAM/ROM 20 or persistent storage 22, display 24, user input devices 26 (such as, for example, keyboard, mouse or other pointing devices, touch screen, etc.), power supply 28 which may include battery or AC power supplies, other interface 30 which attaches the device to a network or other external devices (storage, other computer, etc.).

In operation, the network test instrument is attached to the network, and observes transmissions on the network to collect data and analyze to determine NRT values.

Figure 2:
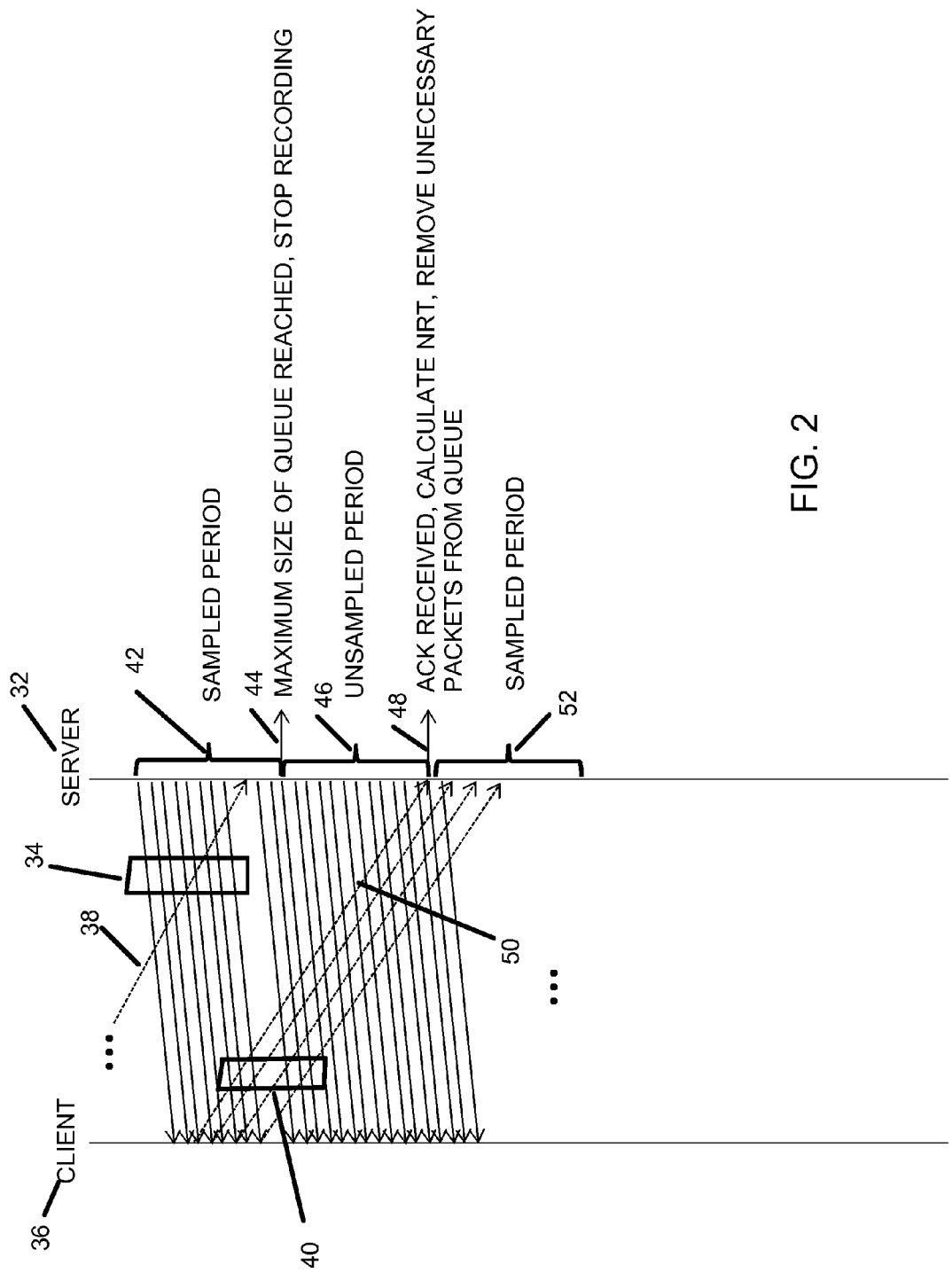

Referring to FIG. 2, a diagram of traffic in operation of the method and apparatus illustrating the operation, traffic 34 is being sent from a server 32 to a client 36, with a group of acknowledgments 38 sent from the client to acknowledge receipt of the traffic. In FIG. 2, acknowledgment 38 is acknowledging a group of traffic 34', not shown, that had been sent from server 32. The traffic in time zone 42 represents a sampled period during which NRT is measured verbosely, for example with each and every round trip event being measured.

A double ended queue of network traffic is provided, with the end of the queue representing the oldest traffic, and the front of the queue representing newly received traffic.

In the illustration of FIG. 2, at time 44, a maximum queue size is reached, as no (or few) ACKs have been received from the client, so recording of the traffic is stopped while the device awaits further ACKs from the client. An unsampled period 46 results, during which NRT data is not measured.

Then, at time 48, an ACK 50 is received, the first ACK seen since ACK 38. At this point, NRT may be calculated based on the oldest data in the double ended queue, the unnecessary packets are removed from the queue (by moving the rear of the double ended queue forward in the data), and sampling continues in sampled period 52 with new data added at the front of the double ended queue, and NRT continued to be calculated on each receipt of an ACK, until such time as the maximum queue size is again reached.

Figure 3:
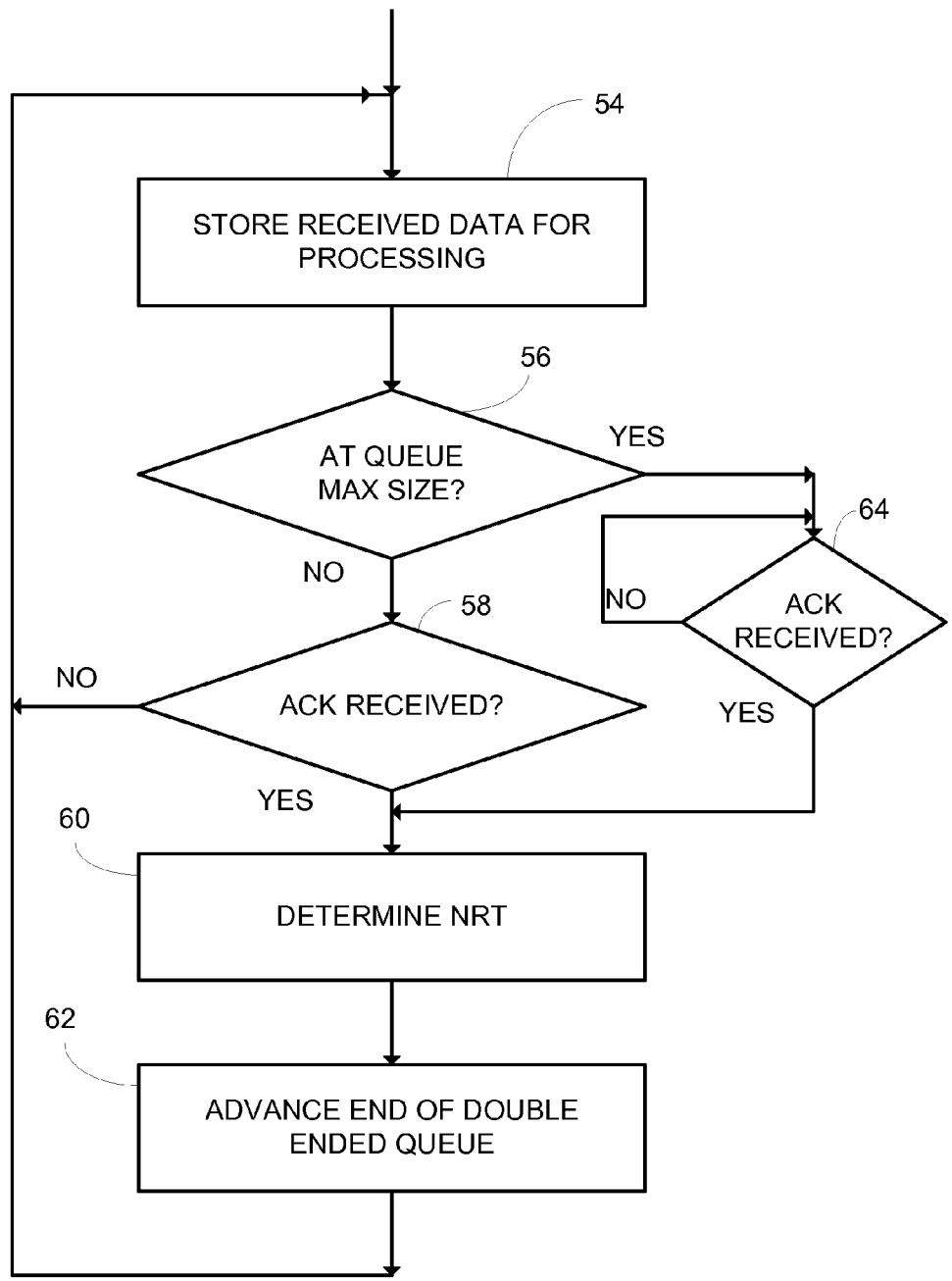
FIG. 3 is a flow chart of the steps of operation.

FIG. 3 is a flowchart illustrating the operational steps of the method, wherein at block 54, observed traffic (e.g., data sent by server 32) is stored for processing. In decision block 56, a determination is made as to whether the maximum allocated size for the double ended queue has been reached. If not, then decision block 58 determines whether an ACK has been received (presumably for the oldest data in the double ended queue, or potentially a later received data block). If not, then the process continues back to block 54, to receive and store further data. If at decision block 58 an ACK has been received, the block 60 determines NRT, and the end of the double ended queue is advance (block 62), wherein processing continues at block 54 to receive and store further data.

Returning to decision block 56, if the maximum size of the double ended queue has been reached, then a wait loop for receipt of an ACK is entered, decision block 64, which waits until an ACK is received, whereupon on receipt of an ACK, block 60 is entered to determine NRT, and processing continues with advancing the end of the double ended queue, and storage of further received data.

Accordingly, a sampling method can be used when the necessary state requirements of the received data grow large, exceeding the allocated size of the double ended queue provided for holding data awaiting analysis. If the state requirements grow too large this system, method and apparatus allow for a pause in NRT analysis while waiting for acknowledgments. When future NRT measurements are calculated, the state size can decrease allowing for the measurement to continue. Using a double ended queue, system, method and apparatus record all packet sequence and acknowledgment state up to a predefined maximum size and on received acknowledgments, calculate NRT values starting from the back of the double-ended queue and releasing any packets for and before the current point of calculation. If the queue has reached a maximum size, the system, method and apparatus stop recording state until acknowledgments are received and the window grows again.

Thus NRTs are calculated during the sampling window and then paused (providing a sampling mechanism) when the queue size reaches is maximum size. If the maximum size is not exceeded, then verbose analysis may be performed, analyzing all of the data (or some subset as desired) allowing for optimal performance at both high traffic rates and low traffic rates.

In operation, the network test instrument embodying the disclosure is attached to the network, and the processor(s) operate the instrument to implement the system, method and device, observing transmissions on the network to collect data and analyze to determine NRT values.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

The invention claimed is:

1. A method for measuring network round trip transmission time comprising:
while maximum storage allocation size for received data has not been reached, storing received data of a first group of traffic for processing;
determining receipt of a first acknowledgement (ACK) signal from the first group of traffic indicating transmission of the first group of traffic has terminated;
determining network round trip time for the first group of traffic upon receipt of the first ACK signal indicating the transmission of the first group of traffic has terminated;
stopping storing of received data upon receipt of the first ACK signal indicating the transmission of the first group of traffic has terminated;
determining receipt of a second ACK signal from a second group of traffic subsequent from the first group of traffic indicating transmission of the second group of traffic;
while maximum storage allocation size for received data has not been reached, storing received data of the second group of traffic for processing upon receipt of the second ACK signal indicating initiation of transmission of the second group of traffic;
determining receipt of a third ACK signal from the second group of traffic indicating transmission of the second group of traffic has terminated;
determining network round trip time for the second group of traffic upon receipt of the third ACK signal indicating the transmission of the second group of traffic has terminated; and
stopping storing of received data upon receipt of the second ACK signal indicating the transmission of the second group of traffic has terminated.

2. The method according to claim 1, wherein said storing comprising storing the received data in a double ended queue.

3. The method according to claim 1, wherein said received data that is stored comprises server packet data.

4. The method according to claim 1, wherein said acknowledgment comprises a client acknowledgment.

5. The method according to claim 1 wherein the stored data comprises data sent by a server.

6. An apparatus for measuring network round trip transmission time comprising:
a network interface for receiving transmissions on a network;
a processor for making determinations based on the received transmissions, said
determination comprising:
while a maximum storage allocation size for received transmissions has not been reached, storing received transmissions of a first group of traffic for processing;
determining receipt of a first acknowledgement (ACK) signal from the first group of traffic indicting the first group of traffic has terminated;
determining network round trip time for the first group of traffic upon receipt of the first ACK signal indicating the transmission of the first group of traffic has terminated;
stopping storing of received transmissions upon receipt of the first ACK signal indicating the transmission of the first group of traffic has terminated;
determining receipt of a second ACK signal from a second group of traffic subsequent from the first group of traffic indicating transmission of the second group of traffic;
while maximum storage allocation size for received data has not been reached, storing received data of the second group of traffic for processing upon receipt of the second ACK signal indicating initiation of transmission of the second group of traffic;
determining receipt of a third ACK signal from the second group of traffic indicating transmission of the second group of traffic has terminated:
determining network round trip time for the second group of traffic upon receipt of the third ACK signal indicating the transmission of the second group of traffic has terminated; and
stopping storing of received data upon receipt of the second ACK signal indicating the transmission of the second group of traffic has terminated.

7. The apparatus according to claim 6, further comprising a double ended queue, wherein said storing comprising storing the received data in the double ended queue.

8. The apparatus according to claim 6, wherein said received data that is stored comprises server packet data.

9. The apparatus according to claim 6, wherein said acknowledgment comprises a client acknowledgment.

10. The apparatus according to claim 6 wherein the stored received transmissions data comprises data sent by a server.

11. A network test instrument for measuring network round trip transmission time comprising:
a network interface for receiving transmissions on a network;
a storage for storing received network transmission data, said storage including an allocated portion having a maximum storage allocation size for storing the receive network transmission data;
a processor for making determinations based on the received transmission data, said determination comprising:
while the maximum storage allocation size for received transmissions has not been reached, storing the received transmissions of a first group of traffic for processing;
determining receipt of a first acknowledgement (ACK) signal from the first group of traffic indicting the first group of traffic has terminated;

determining network round trip time for the first group of traffic upon receipt of the first ACK signal indicating the transmission of the first group of traffic has terminated;

stopping storing of received transmissions upon receipt of the first ACK signal indicating the transmission of the first group of traffic has terminated;

determining receipt of a second ACK signal from a second group of traffic subsequent from the first group of traffic indicating transmission of the second group of traffic;

while maximum storage allocation size for received data has not been reached, storing received data of the second group of traffic for processing upon receipt of the second ACK signal indicating initiation of transmission of the second group of traffic;

determining receipt of a third ACK signal from the second group of traffic indicating transmission of the second group of traffic has terminated;

determining network round trip time for the second group of traffic upon receipt of the third ACK signal indicating the transmission of the second group of traffic has terminated; and stopping storing of received data upon receipt of the second ACK signal indicating the transmission of the second group of traffic has terminated.

12. The network test instrument according to claim 11, wherein said allocated portion comprises a double ended queue, wherein said storing comprising storing the received data in the double ended queue.

13. The network test instrument according to claim 12, wherein storing comprises placing data at the head of the double ended queue.

14. The network test instrument according to claim 12, wherein said determining comprises removing data for which said determining has been performed from the queue.

* * * * *